Feb. 22, 1938.  E. L. HARDER  2,109,215
REGULATING SYSTEM
Filed Dec. 24, 1935    2 Sheets-Sheet 1

WITNESSES:
Michael Stark
C. F. Bryant

INVENTOR
Edwin L. Harder.
BY
ATTORNEY

Feb. 22, 1938.  E. L. HARDER  2,109,215
REGULATING SYSTEM
Filed Dec. 24, 1935   2 Sheets-Sheet 2

Patented Feb. 22, 1938

2,109,215

UNITED STATES PATENT OFFICE 2,109,215

REGULATING SYSTEM

Edwin L. Harder, Pittsburgh, Pa., assignor to Westinghouse Electric & Manufacturing Company, East Pittsburgh, Pa., a corporation of Pennsylvania Application December 24, 1935, Serial No. 56,013

9 Claims. (Cl. 171—229)

My invention relates to electrical regulating systems, and it has particular relation to systems wherein a motor-operated rheostat is utilized to adjust the magnitude of the regulated quantity.

Generally stated, the object of my invention is to obtain finer steps of resistance adjustment than are afforded by a practical number of stationary rheostat contact buttons.

Another object is to lessen the wear on the movable parts of the rheostat.

An additional object is to effect control within a narrow range by means supplemental to the equipment comprised by the conventional form of rheostatic regulator.

A further object is to supplement an automatic regulating system of the rheostatic type by a narrow-range vibrating-contact type of regulator.

In practicing my invention, I achieve the above stated objects by providing the motor-operated quantity adjusting rheostat with control means which are sensitive only to variations of predetermined magnitude in the regulated quantity. The rheostat is provided with a special adjusting member which includes a pair of spaced contacting elements which are adapted at all times to span a portion of the rheostat resistor. A vibrating contact regulator sensitive to small variations in the regulated quantity is then disposed to establish and interrupt at closely spaced time intervals and in adjustable ratio manner a shunt connection around the spanned portion of the resistor. This vibrating device thereby controls the regulated quantity within a range which includes the predetermined larger variations to which the rheostat motor control means are responsive.

My invention, itself, together with additional objects and advantages thereof will best be understood through the following description of a specific embodiment when taken in conjunction with the accompanying drawings in which.

Figure 1:
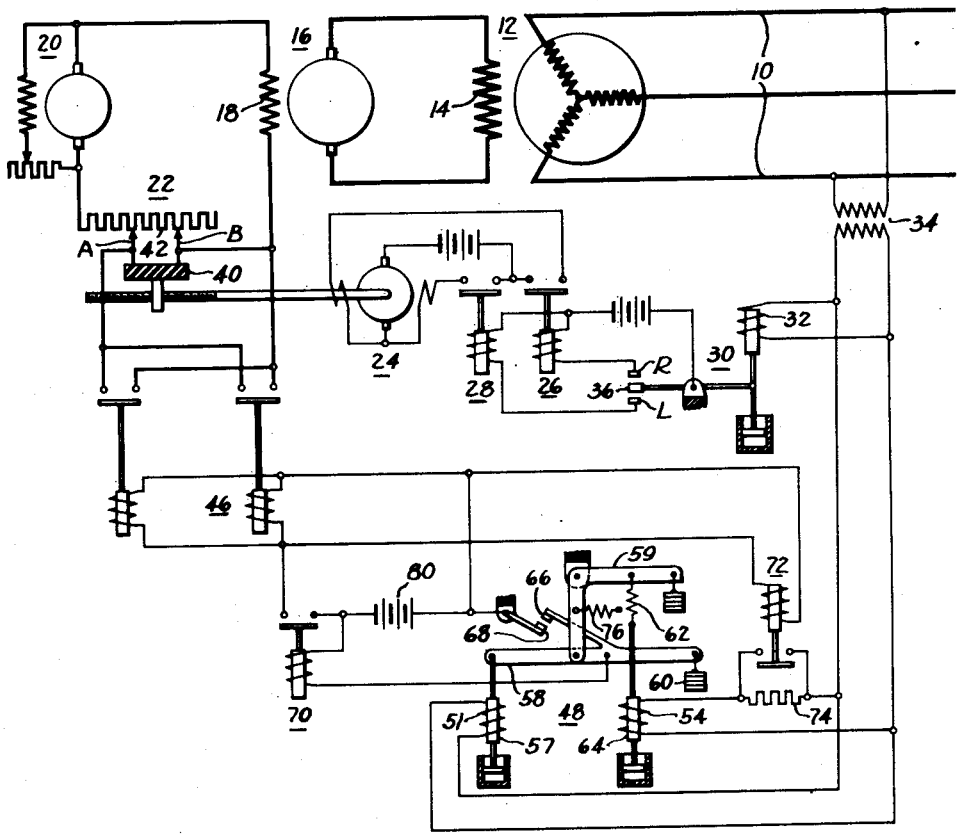
Figure 1 is a diagrammatic representation of apparatus and circuits comprised by one preferred form of the improved regulating system of my invention.

The system represented in Fig. 1 is adapted to maintain constant the voltage of an alternating current circuit 10 which is supplied from a polyphase generator or other dynamo-electric machine 12. The field winding 14 of the generator is energized by an exciter 16 the field winding 18 of which in turn derives energizing current from any suitable source of direct current potential shown in the form of a pilot exciter 20.

For the purpose of adjusting the magnitude of this current to thereby control the voltage of generator 12, a rheostat 22 is connected in the manner shown in the energizing circuit of the exciter field winding. Operation of this rheostat is effected in well known manner by a motor 24 which is controlled through a pair of relays 26 and 28 by means of a contact making device 30. The actuating winding 32 of this device is energized through a transformer 34 by a measure of the voltage of regulated circuit 10.

When, for example, this voltage falls by a predetermined amount below the desired value, device 30 completes through contact members 36 and R an actuating circuit which causes relay 26 to so effect energization of motor 24 that it operates the rheostat 22 in a direction which lowers its effective resistance to thereby correctively raise the voltage of generator 12. Similarly, a rise in the voltage by a predetermined magnitude above the desired value results in the engagement of contact members 36 and L to effect an adjustment of rheostat 22 in the opposite or generator-voltage-lowering direction.

In the conventional type of rheostatic regulator, the contact making device 30 is made sufficiently sensitive to correct for most objectionable variations in the regulated quantity. This frequently requires more or less continuous operation of the rheostat 22, and results in an objectionable amount of wear to relatively heavy moving parts which are expensive to replace. Furthermore, rheostats having a so-called "practical" number of stationary contact buttons are frequently incapable of providing resistance adjustment steps of the fineness desirable in many applications and for this reason may be incapable of maintaining the regulated quantity within limits as close as the application calls for. The expedient of my invention now to be described effectively overcomes the above objectionable features.

Figure 2:
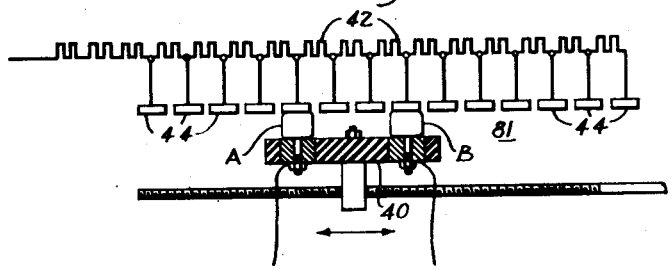
Fig. 2 is a representation of one preferred mechanical arrangement of the stationary contact buttons and the two spaced movable cooperating elements comprised by the rheostat which forms a part of the system of Fig. 1.

In achieving the desired objects I provide the movable member 40 of the rheostat 22 with a pair of elements A and B which are spaced in the manner shown to span a portion 42 of the rheostat resistor. In Fig. 2 one mechanical arrangement of the plurality of stationarily mounted contact buttons 44 which in a conventional device are connected with individual sections of the rheostat resistor is more completely illustrated.

The spanned resistor section 42 is arranged to be periodically shunted by one or more relays 46 to thereby vary the effective resistance thereof. The opening and closing action of these relays is controlled by a vibrating-contact regulating device 48 which is sensitive to small variations in the voltage of regulated circuit 10.

As shown in Fig. 1, the regulator 48 comprises a main control winding 51 energized by the same measure of the regulated circuit voltage as is the beforedescribed motor control device 30. This winding exerts an upwardly acting pull upon a plunger 57 which is linked to one end of a bar 58 suspended at its center from the lower end of a bell-crank lever 59 and carrying at its opposite end a counter-balancing weight 60. Suspended from the horizontal portion of bell-crank 59 by means of a spring 62 is a vibrating element assemblage which includes a plunger 64 upon which a winding 54 exerts an upwardly acting force.

The bar 58 carries a contact member 66 which is disposed to engage a cooperating stationary member 68 in order to complete an energizing circuit for a master relay 70. This relay controls the actuation of resistor shunting relays 46 and also that of a vibration-forcing relay 72, which is disposed, upon actuation, to short circuit a resistor 74 and thereby lower the impedance of the energizing circuit for vibrating element winding 54.

The described vibrating-contact regulator functions to adjust the excitation supplied to the regulated machine by periodically short circuiting the section 42 of rheostat resistance in the excitation control circuit. When contacts 66—68 are closed all the time, the current supplied is maximum and when open all the time a minmum value of current is obtained. By varying the ratio of time that the regulator contacts are closed to the time that they are opened, any value of average current between the limits determined by the section of resistance 42 can be obtained.

In operation of this regulator, engagement of contact members 66—68 effects actuation of master relay 70, which in turn causes actuation of relay 72 to short circuit resistor 74, thereby raising the voltage impressed upon the vibrating control winding 54. The resulting increase in upward pull exerted on plunger 64 allows a tension spring 76 to rotate the bell-crank 59 in a counter-clockwise direction, thereby moving contact 66 to the right and out of engagement with member 68.

This interruption effects the opening of both relays 70 and 72, thereby lowering the voltage impressed upon winding 54 to its original value. The decrease in upward pull on the associated plunger member rotates bell-crank 59 in a clockwise direction thereby moving contact member 66 to the left to reestablish its engagement with member 68. As a consequence, the contact members are again caused to separate in the manner just described and a continuous vibration thereof is effected at a frequency of the order of several times per second.

The elevational position of the horizontally oscillating contact member 66 is determined by the magnitude of the voltage of circuit 10, a measure of which acts upon the main control winding 51 of the regulator. Changes in voltage thus act to vary the ratio of the time that the contacts are closed to the time that they are open. By moving member 66 to a lower position, a decrease in the generator voltage increases the value of this ratio, while by raising the member an increase in generator voltage decreases the ratio value.

Resistor shunting relays 46 follow the vibrating movement of master relay 70 and thereby periodically open and close a shunt circuit around resistor section 42. When the voltage of circuit 10 drops, these relays increase the ratio of the time that the resistor section 42 is short circuited to the time that it is active in the excitation supply circuit with the result that the excitation supplied to machine 12 is appropriately increased to correctively raise the machine voltage back to the desired value.

In a similar manner a rise in the regulated voltage acts to lower the ratio of time that the resistor section 42 is short-circuited to the time that it is active in the excitation-determining circuit with the result that the excitation supplied to machine 12 is lowered and the output voltage thereof correctively lowered back to the desired value.

In this manner the vibrating regulator 48 serves to control the regulated voltage within a range determined by the magnitude of the spanned portion 42 of the rheostat resistor. In practice, this span is so chosen that it will include the predetermined variations from the desired value to which the rheostat motor controlling device 30 is sensitive. For the purpose of effecting this adjustment, the contacting elements A and B may, as shown in Fig. 2, be mounted upon a supporting member of insulating material 81 in a manner to permit of their relative setting closer or further apart. In practice, the proper position can best be determined by experiment.

It will, of course, be understood that the less sensitive the control device 30 is made, the less frequently will adjustments of rheostat 22 by motor 24 be required and the broader must be the range of control effected by the vibrating regulator 48.

Figure 3:
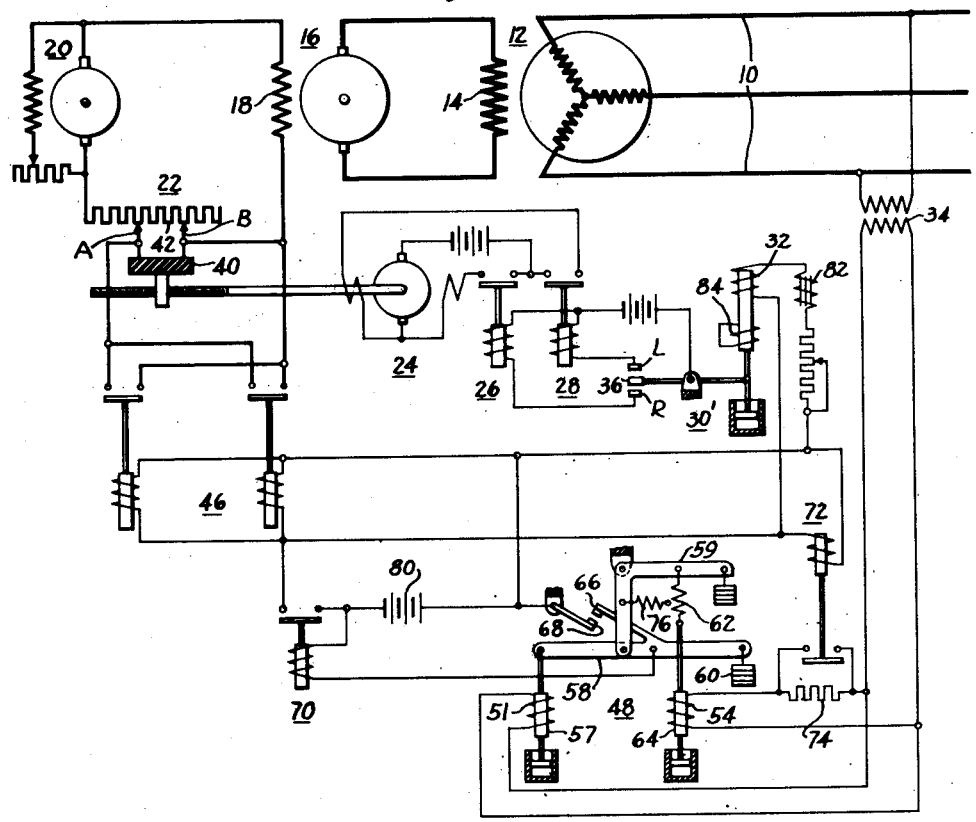
Fig. 3 is a diagrammatic representation of the basic form of system shown in Fig. 1 modified in that the rheostat operating motor derives control from the vibratory regulating element.

In some situations it may be preferable to allow the vibratory regulator 48 to control not only the effective resistance of rheostat section 42, but the operation of rheostat adjusting motor 24 as well. One manner of doing this is shown in Fig. 3. There the motor control relay 30' is energized by the same pulsatory voltage, from source 80, that is impressed upon the vibratory relays 46 and 72.

In the arrangement shown this voltage is impressed upon the main winding 32 of the control relay through a circuit which includes a pulsation-smoothing reactor 82. The relay is also provided with a flux-lag winding 84 short-circuited upon itself as shown. The combined effect is to cause the relay to respond to the ratio of time-open to time-closed periods of the vibrating contacts 66—68.

When this ratio is high, indicating that the effective resistance of rheostat section 42 approaches the maximum and that the assemblage

40 should be adjusted to the right, the effective voltage impressed upon winding 32 is correspondingly low. This allows contact member 36 to engage member L to thereby effect the above described rheostat adjustment. When, on the other hand, this ratio is low, contact member 36 of the relay is brought into engagement with member R and adjustment of the rheostat in the opposite direction takes place.

In consequence, whenever the vibratory regulator 48 approaches either limit of its range of control, the rheostat 22 is automatically adjusted to correctively recentralize the section 42 which is spanned by the movable contacts A and B of the rheostat.

Figure 4:
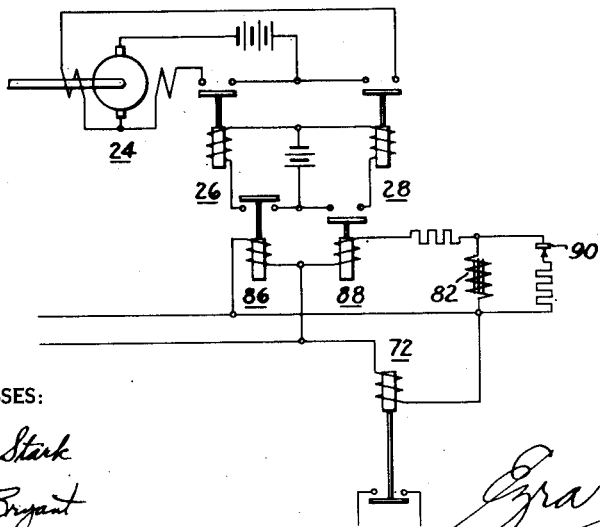
Fig. 4 is a partial reproduction of the sytem of Fig. 3 showing an alternate manner in which the form of control which it typifies may be carried out.

A modification in this basic method of control is shown in Fig. 4. There the relay device 30' is replaced by a pair of relays 86 and 88. Relay 86 is of the under-voltage responsive type and is connected to actuate the "raise" contactor 26 for the rheostat operating motor 24 whenever the time-open to time-closed ratio of regulator contacts 66—68 approaches its high or maximum limit.

Relay 88, on the other hand, is of the over-voltage responsive type which picks up when the above ratio approaches its minimum value and in so doing actuates the "lower" contactor 28 for the rheostat motor. The energizing circuit of this relay is shown as including a current-smoothing reactor 82 and a rectifier 90 connected in a local circuit therewith for the purpose of making the relay 88 more sensitive to the vibratory regulator action.

Although I have shown and described a certain specific embodiment of my invention, I am fully aware that many modifications thereof are possible. My invention therefore is not to be restricted except insofar as is necessitated by the prior art and by the scope of the appended claims.

I claim as my invention:

1. In a regulating system wherein a tapped-resistor type of rheostat operated by a motor controlled by means sensitive to variations in a characteristic of an electrical circuit is utilized to adjust said characteristic, the combination of a resistance-adjusting member for said rheostat which comprises a pair of spaced contacting elements adapted to span different portions of like resistance value of the rheostat resistor, and a vibrating-contact regulator, separate from the rheostat motor control means and sensitive to said characteristic, disposed to establish and interrupt at closely spaced time intervals and in adjustable-ratio manner a shunt connection around the resistor portion between the spaced contacting elements to thereby control the circuit characteristic within a range determined by the spanned portion of said rheostat resistor.

2. A regulating system comprising a quantity-adjusting rheostat which includes a resistor, an operating motor therefor, motor-control means sensitive to variations of predetermined magnitude in the regulated quantity, a resistance-adjusting member for said rheostat comprising a pair of spaced contacting elements adapted to span different portions of like resistance value of the rheostat resistor, and a vibrating-contact regulator, separate from the rheostat motor control means and sensitive to variations in said quantity which are smaller than those designated above, disposed to establish and interrupt at closely spaced time intervals and in adjustable-ratio manner a shunt connection around the resistor portion between the spaced contacting elements to thereby control the regulated quantity within a narrow range.

3. A regulating system comprising a quantity-adjusting rheostat which includes a resistor, an operating motor therefor, motor-control means sensitive to variations of predetermined magnitude in the regulated quantity, a resistance-adjusting member for said rheostat comprising a pair of spaced contacting elements adapted to span different portions of like resistance value of the rheostat resistor, and a vibrating-contact regulator, separate from said motor-control means and sensitive to variations in said quantity which are smaller than those designated above, disposed to establish and interrupt at closely spaced time intervals and in adjustable-ratio manner a shunt connection around the resistor portion included between the spaced contacting elements to thereby control the regulated quantity within a narrow range, the magnitude of the resistor portion spanned by said spaced contacts being so chosen that the range of quantity control effected by the vibrating-contact regulator includes the predetermined variations first referred to.

4. A regulating system comprising a quantity-adjusting rheostat which includes a resistor, a resistance-adjusting member for said rheostat comprising a pair of spaced movable contacting elements adapted to span like portions of said resistor, a vibrating contact regulator, sensitive to variations in the regulated quantity, disposed to establish and interrupt at closely spaced time intervals and in adjustable-ratio manner a shunt connection around the portion of said resistor included between said spaced contacting elements, a motor for changing the position of said rheostat adjusting member, and motor-control means sensitive to the ratio of the time-open to time-closed periods of the vibratory regulator contacts for adjusting the position of said contacting elements.

5. In a regulator system, a circuit to be regulated, means for controlling an electrical quantity of said circuit comprising a resistor, a pair of spaced contact members simultaneously movable to vary the effective value of said resistor and arranged in spaced relation to include similar portions of said resistor therebetween, regulator means responsive to the regulated quantity for varying to positions of said spaced contact member, and separate regulator means also responsive to the regulated quantity for varying the effective value of the resistor portion included between said pair of spaced movable contact members.

6. In a regulator system, a circuit to be regulated, means for controlling an electrical quantity of said circuit comprising a resistor, a pair of spaced contact members simultaneously movable to vary the effective value of said resistor and arranged in spaced relation to include similar portions of said resistor therebetween, motor operated regulator means responsive to the regulated quantity for varying to positions of said spaced contact member, and regulator means operable independently of said first-named regulator means responsive to the regulated quantity for varying the effective value of the resistor portion included between said pair of spaced movable contact members, said second-named regulator means being sensitive to relatively small changes in the regulated quantity and said first-named regulator means being responsive to relatively large changes in the regulated quantity.

7. In a regulator system, in combination, a dynamo-electric machine, a rheostat for controlling a regulated quantity of said machine and comprising a resistor and a pair of spaced movable contact members for engaging said resistor to include like portions of the resistor therebetween independently of the positions thereof, a regulator sensitive to the regulated quantity for varying the effective value of the portion of the resistor included between said spaced contact members, and means actuated upon the approach of said regulator to the end of its range of operation for operating said spaced contact members in the one or the other direction to increase the range of regulation controlled by said regulator in the corresponding direction.

8. In a regulator system, in combination, a dynamo-electric machine, a rheostat for controlling a regulated quantity of said machine comprising a resistor and a pair of spaced movable contact members for connecting said resistor to include like portions of the resistor therebetween independently of the positions thereof, a vibratory regulator sensitive to the regulated quantity for varying the effective value of the portion of the resistor included between said spaced contact members, and motor operated means also responsive to the regulated quantity and operable independently of said regulator means for varying the range of control governed by said regulator means in the one or the other direction.

9. In a regulator system, in combination, a dynamo-electric machine, a rheostat for controlling a regulated quantity of said machine comprising a resistor and a pair of spaced movable contact members for connecting said resistor to include like portions of the resistor therebetween independently of the positions thereof, a vibratory regulator sensitive to the regulated quantity for varying the effective value of the portion of the resistor included between said spaced contact members, and motor operated means controlled by said vibratory regulator and operative upon the approach of said vibratory regulator to the end of its range of operation for operating said movable contact members in a direction to increase the range of regulation by said vibratory regulator in the one or the other direction.

EDWIN L. HARDER.